United States Patent
Font et al.

(10) Patent No.: US 7,735,341 B2
(45) Date of Patent: Jun. 15, 2010

(54) SYSTEM FOR MAKING CLIPPED THERMOPLASTIC YARNS

(75) Inventors: Dominique Font, Saint-Baldoph (FR);
Henri Prevosto, Aix les Bains (FR);
Laurent Berthelon, La Ravoire (FR)

(73) Assignee: OCV Intellectual Capital, LLCDE (US)

( * ) Notice: Subject to any disclaimer, the term of this patent is extended or adjusted under 35 U.S.C. 154(b) by 1707 days.

(21) Appl. No.: 10/169,724

(22) PCT Filed: Jan. 24, 2001

(86) PCT No.: PCT/FR01/00219

§ 371 (c)(1),
(2), (4) Date: Jul. 15, 2002

(87) PCT Pub. No.: WO01/61088

PCT Pub. Date: Aug. 23, 2001

(65) Prior Publication Data

US 2003/0000258 A1  Jan. 2, 2003

(30) Foreign Application Priority Data

Feb. 16, 2000 (FR) .................................. 00 01885

(51) Int. Cl.
*C03B 37/022* (2006.01)
(52) U.S. Cl. .............................. 65/536; 65/171; 65/172; 65/173
(58) Field of Classification Search .................. 65/471, 65/495, 505, 520, 521, 523, 27, 171, 172, 65/173, 536, 534
See application file for complete search history.

(56) References Cited

U.S. PATENT DOCUMENTS

| 3,644,109 | A |   | 2/1972  | Klink et al. |
| 3,765,739 | A | * | 10/1973 | Williams ...................... 312/30 |
| 4,049,411 | A | * | 9/1977  | Long et al. .................... 65/478 |
| 4,057,195 | A | * | 11/1977 | Jones et al. .............. 242/476.1 |
| 4,071,340 | A |   | 1/1978  | Melle |
| 4,118,210 | A | * | 10/1978 | Watanabe et al. ............. 65/478 |

(Continued)

FOREIGN PATENT DOCUMENTS

EP  0 849 381  6/1998

(Continued)

OTHER PUBLICATIONS

US. Department of Labor, The 100 Most Frequently Cited OSHA Construction Standards in 1991: A Guide for the Abatement of the Top 25 Associated Physical Hazards, Reprinted Mar. 1995, p. 70-71.*

*Primary Examiner*—John Hoffmann
(74) *Attorney, Agent, or Firm*—James J. Dottavio; Kathryn W. Grant

(57) ABSTRACT

A system for making clipped thermoplastic yarns or filaments, such as chipped glass yarns, including at least a die co-operating with at least a cutting machine located in extension of each other. A mechanism sizes the yarns and/or filaments coming from the die. The system further includes at least one return mechanism and a floor. Further, a mechanism displaces and positions the cutting machine in at least two positions, the first position being beneath the floor and the second position being above the floor. A first opening is provided in the floor through which the cutting machine is moved.

20 Claims, 2 Drawing Sheets

U.S. PATENT DOCUMENTS

| | | | |
|---|---|---|---|
| 4,175,939 A | 11/1979 | Nakazawa et al. | |
| 4,208,016 A | 6/1980 | Jones et al. | |
| 4,279,453 A * | 7/1981 | Haas | 312/282 |
| 4,287,799 A | 9/1981 | Fujita et al. | |
| 4,349,365 A * | 9/1982 | Matteson et al. | 65/539 |
| 4,362,541 A * | 12/1982 | Thompson | 65/478 |
| 4,411,180 A | 10/1983 | Roncato | |
| 4,469,499 A * | 9/1984 | Lecron et al. | 65/471 |
| 4,537,610 A * | 8/1985 | Armstrong et al. | 65/450 |
| 4,576,621 A | 3/1986 | Chappelear et al. | |
| 4,853,017 A * | 8/1989 | Eberle et al. | 65/453 |
| 5,935,289 A * | 8/1999 | Arterburn et al. | 65/471 |
| 6,076,442 A * | 6/2000 | Arterburn et al. | 83/13 |
| 6,221,506 B1 * | 4/2001 | Guerlet et al. | 428/596 |
| 2003/0000258 A1 * | 1/2003 | Font et al. | 65/486 |

FOREIGN PATENT DOCUMENTS

| | | |
|---|---|---|
| EP | 0 879 803 | 11/1998 |
| FR | 2 346 272 | 10/1977 |
| JP | 04 164838 | 6/1992 |

* cited by examiner

SYSTEM FOR MAKING CLIPPED THERMOPLASTIC YARNS

BACKGROUND OF THE INVENTION

1. Field of the Invention

The present invention relates to the field of the manufacture of chopped thermoplastic yarns, in particular of glass yarns, and it relates more specifically to a system for the manufacture of such yarns.

2. Description of the Related Art

Numerous devices capable of carrying out such manufacturing operations are known. These systems generally comprise at least one bushing from which glass yarns are drawn and conveyed to a chopping device composed, for example, of a back-up roll or anvil which interacts with a chopping roll equipped with evenly distributed blades at its periphery. The chopper is positioned so as to come into contact under pressure with the circumferential surface of the back-up roll, thus defining a chopping region.

The French certificate of addition FR 2 075 019 illustrates a system of this type in which a bushing is used in combination with a chopping device.

In order to increase the production efficiency of plants for the manufacture of chopped yarns, solutions have been devised according to which several bushings feed a single chopping device. French patent FR 2 490 251 illustrates a solution of this type. These techniques exhibit a priori the advantage of having a single chopping machine used in combination with several bushings.

However, in use, these plants display several disadvantages: first, rapid wearing of the chopping rolls, this being because these rolls have to chop very large amounts of yarns. Production is ordinarily of the order of 12 tones of chopped yarns per day, so that the chopping rolls have to be replaced after 6 to 8 hours of operation. This arrangement exhibits the following disadvantages:

the loss of glass flowing from the bushings
thermal conditions for the bushings and duct which are disrupted.

Furthermore, as several yarns feed a single chopper, the dispersion with regard to the glass delivery of each bushing makes it necessary to consider the mean of the deliveries for the calculation of the speed of a chopping device. That is to say, a high standard deviation with regard to the count, which is not satisfactory with regard to the quality of the finished product and which gives outputs which decline in proportion as the bushing departs from the standard.

In addition, the current tendency is to increase the number of filaments per strand. Each strand thus becomes increasingly difficult to chop. This results in uneven chopping with more or less fine offshoots and, consequently, in a nonhomogeneous density of the final product. An increase in the chopping pressure, which prematurely wears out the wheels and can result in melting phenomena, should also be noted.

Another important problem related to this concept concerns the splittings of the yarns. These splittings or "breakages" lead to human intervention to restart the yarn in the chopping machine. This incident is therefore particularly damaging to the production output as it requires a relatively long preparation time.

Furthermore, the broken end from a bushing can interact and result, by rolling up on a guiding member, in the breakage of the other bushings, with then the necessity to restart all the bushings. This human intervention indeed necessitates a very long period of interruption of the production since the operator then has to successively restart each of the yarns.

SUMMARY OF THE INVENTION

The present invention provides a solution to the above-mentioned problems. It makes it possible to increase the production efficiency of such systems and to reduce the production costs while meeting the new expectations of the clients.

More specifically, the present invention makes it possible in particular to increase the lifetime of each chopping roll.

In addition, better control of the quality of the final product is achieved.

Thus, a subject matter of the present invention is a system intended for the manufacture of chopped thermoplastic yarns, such as chopped glass yarns, comprising at least one bushing which interacts with at least one chopping machine, the one placed in the extension of the other, at least one return means, a means for sizing the yarns and/or the filaments resulting from the bushing, and a floor.

In accordance with the invention, said system additionally comprises a means intended to move and to position the chopping machine in at least two positions: one below said floor and the other above said floor, and a first opening in the floor close to said machine through which the chopping machine is moved.

In addition, the system can comprise a means intended to separate the yarns before their entry into the chopping machine.

In accordance with one characteristic of the invention, the system additionally comprises a component intended to cover said first opening in the floor, in particular when the machine is positioned below the floor.

Without departing from the scope of the invention, the movement means comprises a substantially horizontal axis about which the chopping machine can be moved between the first position and the second position.

Preferably, the various components are positioned so that the path of the yarns and of the filaments from the bushing as far as the chopping machine is, overall, within a vertical plane, the filaments having a substantially vertical direction from the bushing as far as the return means and the yarns having a substantially horizontal direction from the return means as far as their entry into the chopping machine.

Advantageously, the system according to the invention additionally comprises at least one second opening in the floor for the passage of the filaments, downstream of the bushing and before they pass onto the return means.

According to one embodiment of the invention, the system comprises several bushings, each used in combination with a chopping machine, and said bushings are aligned along side one another.

Thus, the chopping machines are aligned in parallel to said bushings.

According to a preferred characteristic of the invention, each bushing comprises at least 4 000 holes for passage of the thermoplastic filaments.

In addition, the system can comprise a means for individually adjusting the drawing rate of the yarns as a function of the delivery of the associated bushing.

Other characteristics, details and advantages of the present invention will become more clearly apparent on reading the description which will follow, given by way of illustration and without implied limitation, with reference to the appended drawings, in which:

DETAILED DESCRIPTION OF THE PREFERRED EMBODIMENT

Figure 1:
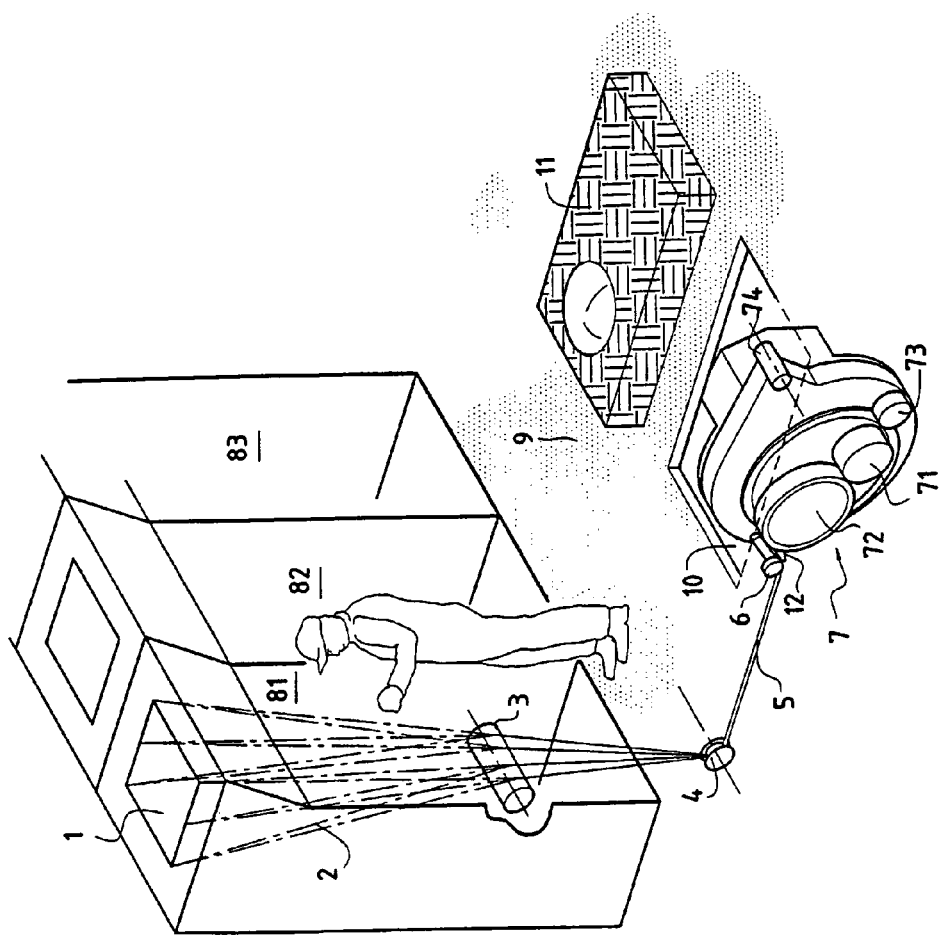
FIG. 1 is a simplified general view of an embodiment of the invention.

The system according to the invention thus appears schematically in FIG. 1, which system comprises at least one bushing 1 fed, in a known way, from molten glass or from glass beads delivered by a feed device (not shown). These bushings, for example made of rhodium-platinum, are usually heated by the Joule effect. They are equipped in their lower part with a plurality of orifices, from which a plurality of filaments 2 (some are represented here in dot-and-dash lines) can be drawn mechanically.

The filaments 2 can be subjected to sizing, that is to say to a chemical treatment intended to apply a sizing product or lubricant thereto, by virtue of a sizing roll 3.

The filaments 2 resulting from a bushing are subsequently gathered together into at least one yarn which is diverted by a means, such as a small "diversion" wheel 4, in order to divert the yarns 5 or strands and to convey them to a chopping machine 7 situated in front of the bushing 1, sizing roll 3 and small diversion wheel 4 unit.

Without departing from the scope of the invention, the chopping machine 7 can be placed behind the bushing.

Preferably, said chopping machine 7 can comprise a blade-holder wheel 71, an anvil wheel 72 and optionally a grinding wheel 73, as disclosed, for example, in patent application FR 2 075 019, filed on behalf of the applicant company.

In accordance with the invention, the chopping machine additionally comprises a preferably horizontal pivot part 74 about which it can rotate in order to change from a first position to a second position.

Furthermore, the arrangement of the main constituents of the system according to the invention is such that the path of the filaments 2 and then of the yarns 5 is, overall, within a vertical plane from the bushing 1 as far as the chopping machine 7. More specifically, the filaments 2 first have a substantially vertical direction from the bushing 1 as far as the small diversion wheel 4 and then the yarns 5 describe a substantially horizontal path as far as their entry into the chopping machine 7. A small guiding wheel 6 can be provided at the inlet of the machine 7 in order to guarantee an arc for winding the yarns onto the anvil wheel 72 which is sufficiently great to ensure the entrainment of said yarns by the frictional force.

A comb 12 placed immediately at the inlet of the chopping machine 7 makes it possible to keep the yarns separate for their chopping in the machine 7 during the displacement of these yarns in the to-and-fro movement which is usually carried out to distribute the wear over the entire width of the wheel.

The bushing 1 and the sizing roll 3 are preferably positioned below one another, for example in the same fiberizing cubicle 81, which rests on a floor 9, itself pierced by at least one first opening 10 for the passage of the chopping machine 7.

The small diversion wheel 4 is preferably positioned at the base of the sizing roll 3, below the floor 9. A second opening (not visible) made in the floor 9 advantageously makes possible, according to the invention, the passage of the bundle of filaments 2 downstream of the sizing roll 3. The second opening (not represented) can also make possible the discharge of the fibers during breakages.

Thus, the filaments 2 exhibit a substantially vertical path from the bushing 1 as far as the small diversion wheel 4, which diverts the yarns by approximately 90° in order to convey them horizontally (or substantially horizontally) to the chopping machine 7. The latter is placed in front of the fiberizing cubicle 81, either above the floor 9 or below. When the chopping machine 7 is positioned below the floor 9, a lid 11 will preferably cover the opening 10 in the floor 9.

Figure 2:
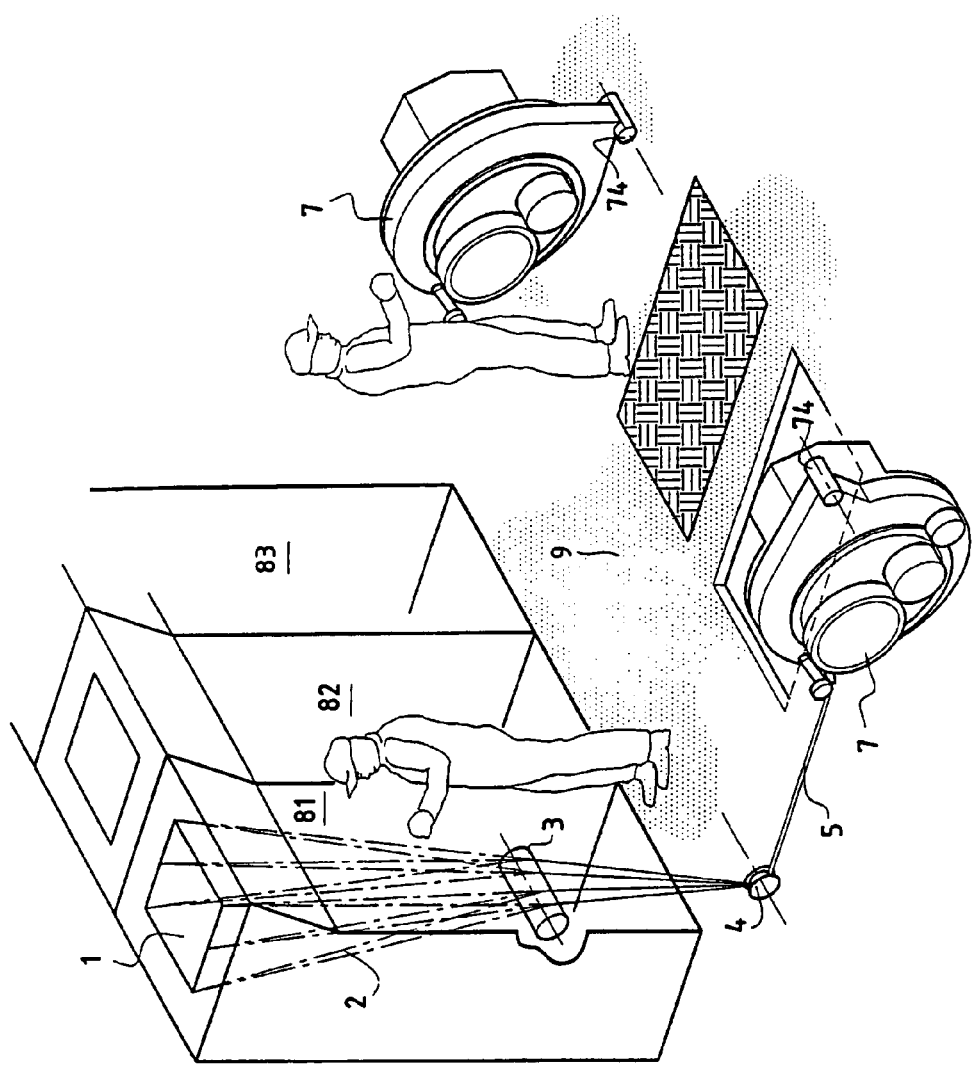
FIG. 2 is a view by which the chopping machine can be seen in two different positions.

FIG. 2 illustrates the possible positions of the chopping machine 7.

At the front of this figure, the machine is represented in the bottom position, below the floor 9, the "production" position. In the background, a chopping, machine 7 is represented in the top "maintenance" position.

This arrangement advantageously makes it possible to interfere neither with the visual field of the operators nor with their movements around the various machines.

Of course, each chopping machine 7 is equipped with a horizontal axis of rotation 74 or with any other equivalent means which allows it to be changed from one position to another.

In the raised position, the operator can, for example, change a wheel or any other component on the machine 7. Any minor maintenance operation is therefore carried out in this position. For larger-scale maintenance, it is possible to replace a defective machine with a spare machine. By way of illustration, a spare machine, ready to operate, can be provided for all the machines in operation.

The present invention makes it possible to keep the yarns separate from the small diversion wheel 4 as far as contact with the anvil wheel 72 and the blade-holder wheel 71. This is because the simplicity of the path of the yarns 5, from the small diversion wheel 4 as far as the chopping machine 7, makes it possible to keep the yarns separate in a simple and therefore reliable way. This parting device will make it possible to produce the chopped yarn starting from large bushings equipped with several thousand nipples, without encountering problems of chopping quality or of premature wear of the drawing rolls.

Restart in the chopping machine 7 can be automatic, without human intervention.

The present invention advantageously makes it possible to meet the increasingly pronounced requirements of the client as regards quality.

The quality of the chopping is improved in particular in terms of density (more constant) and of integrity, that is to say of cohesion of the filaments forming the yarns.

Furthermore, the arrangement according to the invention makes possible perfect control of each bushing. This is because it is possible to indeed adjust the speed of each chopping machine 7 to the draw of the associated bushing 1. A specific adjustment of the draw is thus carried out for each bushing-chopper unit so that a product of high quality can be obtained. An improvement in observing the specifications occurs according to the invention.

Another major advantage of the device according to the invention relates to the increase in the output. By way of illustration, the bushings used in combination with a single chopper as known to date each exhibit at most 4 000 holes. Beyond this value, the chopper exhibits major problems, breakages are very frequent, the output decreases and the quality of the final product is mediocre. In other words, such a process reaches its limits.

In accordance with the present invention, each bushing can deliver at least 6 000 filaments without any of the problems stated above being posed. A significant increase in production results therefrom.

Furthermore, given that, with known multibushing processes, the chopping machine has to chop a very large number of yarns, its rate of breakage is very high. The present invention makes it possible to reduce this rate by the order of 80% as the transient phases (after restart) are much reduced and there is no longer interaction between the bushings.

Breakages (transient breakages and the like) due to the science of heat and breakages due to the path itself are reduced as each bushing 1 operates according to more stable and therefore more reliable conditions.

Furthermore, the lifetime of each anvil wheel 72 is greatly increased because the machining is direct and simplified. The lifetime should change from 5 hours currently to 25 hours according to the invention.

This, of course, decreases the times of intervention by the operators, even if the latter have to manage several chopping machines (instead of just one). According to the prior art, it takes approximately a quarter of an hour to change a wheel; the reduction in the number of interventions of this type is therefore synonymous within an appreciable saving in time.

In addition, it is advantageous to be able to produce, according to the invention, chopped yarns composed of filaments 2 with a small diameter of less than 10 μm. By way of example, the present invention makes it possible to produce yarns 5 composed of filaments 2 with a diameter of 9 μm, the chopped yarns having lengths of between 1.5 mm and 50 mm. Of course, the present invention also makes it possible to manufacture chopped yarns composed of filaments 2 having a larger diameter.

Each bushing 1-chopper 7 unit according to the invention necessitates a reduction in size; its width can be of the order of 1 m; its depth is approximately at least two meters while its total height is approximately 2.50 meters.

A preferred arrangement of the invention can consist of a line of several units (or modules) 81, 82, and 83 as represented schematically in FIGS. 1 and 2.

Thus, an operator can easily monitor all the bushing 1-chopper 7 units and can rapidly intervene with regard to a faulty unit without the others being subjected to the least interference.

Furthermore, such an arrangement makes possible products of as many different natures as the number of modules. This flexibility in production, which is found not only in the nature of the product but also in its amount, is another advantage inherent in the present invention.

An appropriate number of modules can be installed according to requirements. Depending upon the desired production, all or a portion of the modules may be operated simultaneously. Likewise, the development of a novel fiberizing process can be carried out on an isolated module, without interrupting or interfering with the operation of the other modules.

The improvements mentioned above, which are in no way limiting, should, of course, be regarded as the result of the combination of the constituent components of the invention.

The invention claimed is:

1. A system for manufacturing chopped thermoplastic yarns or filaments, comprising:
    at least one bushing for producing yarns or filaments;
    means for sizing the yarns or filaments produced by the bushing;
    a chopping machine provided for chopping the yarns or filaments produced by at least one of the bushings;
    at least one filament diverting means;
    a floor;
    means for mounting the chopping machine for movement to at least first and second positions, the first position being below said floor and the second position being above said floor; and
    a first opening in the floor through which the chopping machine may be moved.

2. The system as claimed in claim 1, further comprising means for separating the yarns before entry into the chopping machine.

3. The system as claimed in claim 1, further comprising a covering component configured to cover said first opening.

4. The system as claimed in claim 3, wherein the covering component covers said first opening when the chopping machine is positioned in the second position.

5. The system as claimed in claim 1, further comprising at least one second opening in the floor for passage of the yarns or filaments, downstream of the bushing and upstream of the diverting means.

6. The system as claimed in claim 1, wherein the at least one bushing comprises a plurality of bushings, further comprising a plurality of said chopping machines, each bushing being used in combination with one of said chopping machines, and wherein the plurality of bushings are aligned along one side of another.

7. The system as claimed in claim 6, wherein the chopping machines are aligned in parallel to alignment of said plural bushings.

8. The system as claimed in claim 1, wherein each bushing comprises at least 4,000 holes for passage of thermoplastic forming the filaments.

9. The system as claimed in claim 1, wherein said floor comprises a second opening and is configured to support at least one cubicle comprising said at least one bushing and to allow an operator to walk about a room containing said system.

10. The system as claimed in claim 1, wherein the at least one bushing is made of at least one of rhodium and platinum.

11. The system as claimed in claim 1, wherein the at least one bushing is configured to be heated by the Joule effect.

12. The system as claimed in claim 1, wherein the at least one bushing comprises at least four bushings.

13. The system as claimed in claim 12, wherein the at least one chopping machine comprises at least four chopping machines.

14. The system as claimed in claim 1, wherein the at least one bushing comprises at least seven bushings.

15. The system as claimed in claim 14, wherein the at least one chopping machine comprises at least seven chopping machines.

16. A system for manufacturing chopped thermoplastic yarns or filaments, comprising:
    at least one bushing unit for producing yarns or filaments;
    a sizing unit configured to size the yarns or filaments produced by the bushing unit;
    at least one filament diverting unit configured to divert the yarns or filaments;
    a floor configured to support at least one cubicle comprising said at least one bushing unit;
    a moving and positioning unit configured to support a chopping unit for movement to at least first and second positions, the first position being a production position below said floor and the second position being a maintenance position above said floor, wherein the moving and positioning unit comprises a horizontal pivot part about which the chopping unit can be moved between the first position and the second position; and a first opening in the floor through which the chopping unit may be moved.

17. The system of claim 16, wherein the at least one bushing unit, sizing unit, at least one filament diverting unit, and at least one chopping unit are positioned so that a path of the yarns or of the filaments from the bushing unit to the chopping unit is, overall, within a vertical plane, whereby the filaments have a vertical direction from the bushing unit to the at least one filament diverting unit and the yarns have a horizontal direction from the at least one filament diverting unit to entry of the yarns into the chopping unit.

18. The system of claim 16, wherein the at least one bushing unit comprises a plurality of bushing units, each bushing unit provided in combination with a chopping unit, and wherein said plurality of bushing units are aligned along one side of another.

19. A system for manufacturing chopped thermoplastic yarns containing filaments, comprising:

at least one bushing for producing yarns;

means for sizing the yarns or filaments produced by the bushing;

a chopping machine provided for chopping the yarns produced by the bushing;

at least one filament diverting means;

a floor;

means for moving and positioning the chopping machine for movement to at least first and second positions, the first position being below said floor and the second position being above said floor; and a first opening in the floor through which the chopping machine may be moved.

20. The system of claim 19, wherein the means for moving and positioning the chopping machine comprises a substantially horizontal axis about which the chopping machine is moved between the first position and the second position.

* * * * *